Feb. 11, 1958 R. B. TROUSDALE 2,823,322
ELECTRONIC SWITCH
Filed Aug. 23, 1955
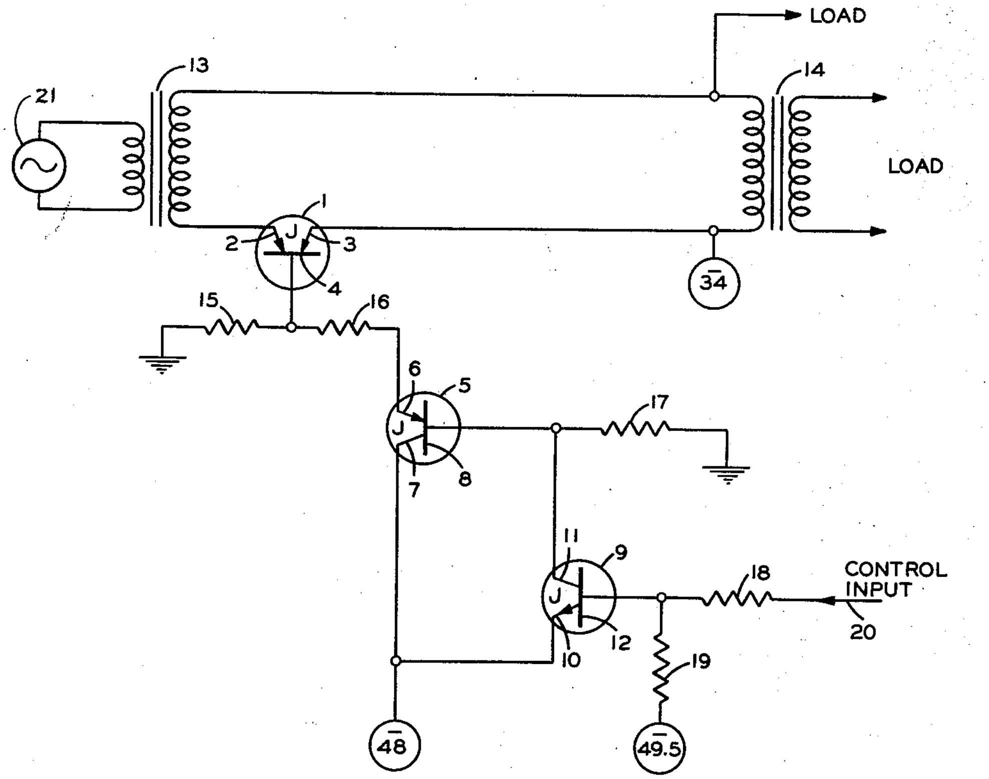
INVENTOR.
ROBERT B. TROUSDALE
BY F. H. Henson
AGENT

United States Patent Office 2,823,322

Patented Feb. 11, 1958

2,823,322

ELECTRONIC SWITCH

Robert B. Trousdale, Webster, N. Y., assignor to General Dynamics Corporation, a corporation of Delaware Application August 23, 1955, Serial No. 530,155

2 Claims. (Cl. 307—88.5)

This invention relates in general to electrical circuits, and more particularly to electronic switches for use in controlling electrical circuits.

With the advent of electronically controlled telephone and other communication systems, a need has arisen for an inexpensive electronic switch capable of switching communication and control signals without undue attenuation or distortion. For example, in the electronic telephone system disclosed in my copending application, Serial No. 492,064, filed March 4, 1955, and assigned to the same assignee as the present invention, electronic switches are utilized to close the communication circuit between a calling line and a selected called line, to connect a ringing source to the called line, and for many other purposes.

An electronic switch comprising a bilateral transistor is disclosed in my copending application, Serial No. 529,230, filed August 18, 1955, and assigned to the same assignee as the present invention. As shown in that application, the transistor has first and second junctions serially connected with the circuit to be closed and the switch is turned "off" and "on" by the application of suitable potentials to the control or base electrode of the transistor. When the switch is in the "on" condition and in the absence of signals, both junctions are biased in the forward direction as if they were emitter junctions. The instantaneous value of the signal determines which of the junctions functions as an emitter junction and which of the junctions functions as a collector junction. During positive half-cycles, the signal current adds to the base current, and during negative half-cycles, the signal current subtracts from the base current when a PNP transistor is used. Since it is necessary to supply the transistor with a saturating base current during the entire signal cycle, it is necessary to provide a controlling potential source of high enough potential to offset the degenerative effect of the signal during negative half-cycles.

The switch disclosed in the above-identified application is capable of switching communication and other low power signals with a relatively small amount of controlling D.-C. power. However, when the switch is used for switching ringing power or any other high power signal, an appreciable amount of controlling D.-C. power is required for operation of the switch.

Accordingly, it is the general object of this invention to provide a new and improved electronic switch for opening and closing electrical circuits.

It is a more particular object of this invention to provide a new and improved electronic switch capable of switching relatively large amounts of power under control of a relatively small amount of power.

According to the present invention, the signal source is connected between one of the emitter-collector electrodes and one terminal of the output impedance. The second emitter-collector electrode and the other terminal of the load impedance are both connected to a source of potential. In other words, the signal source is permitted to float. Switching power is applied directly between the base and the second electrode and from the base to the first electrode through the output impedance and the signal source. When the transistor is conductive, the A.-C. signal is conducted by the transistor but the base current is not modulated by the A.-C. signal because of the local base current circuit between the second electrode and the base electrode.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing which shows a bilateral transistor switch and a suitable control circuit for said switch.

Referring to the drawing, it will be noted that transistors 1 and 5 are of the PNP junction type while transistor 9 is of the NPN junction type. As is well known in the art, transistors 1 and 5 could be of the NPN type and transistor 9 could be of the PNP type if the polarity of the biasing potentials was reversed. Transistors 5 and 9 have been given the conventional notation of an arrow identifying the emitter electrode while transistor 1 has been given the notation of an arrow superimposed on both the so-called emitter and collector electrodes. This notation signifies that transistor 1 is bilateral in operation and has good amplification with either junction used as the emitter. Most transistors have this characteristic to a sufficient extent although better results can be achieved with transistors specially designed to have good forward and reverse characteristics. Also, it will be noted that a transformer has been shown for coupling the electronic switch to the load. It is to be understood that any type of load impedance can be used since the load side of the switch has an A.-C. ground return.

The circuit illustrated is suitable for use as a ringing interrupter or the like. The electronic switch comprising transistor 1 is connected in series between any suitable source of signals, such as signal source 21, and the load impedance, which may be a number of line circuits in parallel when the circuit is used as a ringing interrupter. Input signals from signal source 21 are coupled through transformer 13 and applied between the first emitter-collector electrode 2 of transistor 1 and the upper end of the primary winding of the output transformer 14. Both the lower end of the primary winding of transformer 14 and the second emitter-collector electrode 3 are connected to a first potential of −34 volts, which may be derived from any suitable source of potential. The conductivity of transistor 1 is controlled over a connection to its control or base electrode 4. A two-stage amplifier, comprising transistors 5 and 9, controls the "off-on" condition of the electronic switch under control of signals applied to the control input conductor 20 which terminates in resistor 18. When the circuit is used as a ringing interrupter, the application of signals to the control input conductor may be controlled, in turn, from suitable low level multivibrators or the like.

With the potentials shown in the drawing, the electronic switch is in the "off" condition whenever the signal applied to the control input conductor 20 is at approximately −48 volts. Under these conditions, NPN transistor 9 is biased for non-conduction since its base electrode 12 is slightly negative with respect to its emitter electrode 10. The potential of base electrode 12 is controlled by the voltage division between resistors 18 and 19, which are returned to −48 volts and −49.5 volts, respectively, while emitter electrode 10 is connected directly to −48 volts. PNP junction transistor 5 is biased for non-conduction by the connection of ground through resistor 17 to its base electrode 8. Emitter electrode 6 of transistor 5 is slightly negative with respect to base electrode 8 because of the voltage drop in resistor 15 due to the very small current flow through the back impedance of the junctions of non-conducting transistor 1 to −34 volts. PNP transistor 1 is biased for non-conduction since its base electrode 4 is positive with respect to its emitter-collector electrodes 2 and 3. With the potentials shown, the peak signal voltage blocked by the switch must not be greater than 34 volts.

When an "on" signal, which is positive going from −48 volts, is applied to the control input conductor 20, transistor 9 is rendered conductive. When transistor 9 is fully conductive, the potential of collector electrode 11 of transistor 9 falls to approximately −48 volts and thus biases transistor 5 for conduction. When transistor 5 is fully conductive, the potential of collector electrode 6 falls to approximately −48 volts and transistor 1 is rendered conductive by the resulting voltage division between resistors 15 and 16. When transistor 1 is conductive, the circuit is closed between the input and output circuits. In the absence of signals, both junctions of transistor 1 are biased in the forward direction as if they were emitter junctions. Base current flows from the first potential of −34 volts, through the junction between electrodes 3 and 4, and through resistor 16 and transistor 5 to the second potential of −48 volts. Base current also flows from −34 volts through the primary winding of output transformer 14, the secondary winding of input transformer 13, the junction between electrodes 2 and 4, and through resistor 16 and transistor 5 to −48 volts.

During the half-cycle of an input signal which causes the upper end of the secondary winding of input transformer 13 to become more negative, the junction between electrodes 2 and 4 acts as an emitter junction and the junction between electrodes 3 and 4 acts as a collector junction to conduct the signal current. Electrode 2 then follows the potential of electrode 3. In other words, electrodes 3, 4, and 2 remain at a potential of approximately −34 volts so that the magnitude of the base current remains the same regardless of the instantaneous flow of the signal passed by the switch.

During the half-cycle of an input signal which causes the upper end of the secondary winding of input transformer 13 to become positive with respect to −34 volts, the junction between electrodes 3 and 4 acts as an emitter and the junction between electrodes 2 and 4 conducts the signal current as if it were a saturated collector junction. With transistor 1 fully conductive, the potential of electrodes 2, 3, and 4 is again approximately −34 volts and the flow of base current is maintained at the same value. Thus it can be seen that the A.-C. signals are conducted through transistor 1 but the base current is not modulated by said signals.

As shown, the output may be taken directly from the upper terminal of the primary winding of transformer 14 or may be taken from the secondary winding of transformer 14. As previously mentioned, transformer 14 may be replaced with a suitable output resistor, if desired, since the load side of the switch has an A.-C. ground return.

In one tested embodiment of the invention, wherein transistors 1 and 5 were type 2N57 and transistor 9 was type 2N35, the switch was used for switching seven watts of 20-cycle ringing current at 20 volts R. M. S.

While there has been disclosed what is considered at present to be the preferred embodiment of the invention, other modifications will readily occur to those skilled in the art. It is not, therefore, desired that the invention be limited to the specific arrangement shown and described, and it is intended to cover in the appended claims all such modifications as fall within the true spirit and scope of the invention.

What is claimed is:

1. In combination, an electronic switch comprising a semi-conductive device having first and second electrodes, a control electrode, a first emitter-collector junction between said first and control electrodes, and a second emitter-collector junction between said second and control electrodes, a source of signals, a source of potential, a load impedance having first and second terminals, means for connecting said source of signals between said first electrode and said first terminal of said load impedance, means for connecting both said second electrode and said second terminal of said load impedance to said source of potential, and means associated with said control electrode for enabling said device to pass signals from said source of signals to said load impedance with the instantaneous value of said signals determining which of said first and second junctions functions as an emitter junction and which of said first and second junctions functions as a collector junction.

2. In combination, an electronic switch comprising a semi-conductive device having first and second electrodes, a control electrode, a first emitter-collector junction between said first and control electrodes, and a second emitter-collector junction between said second and control electrodes, a source of signals, a source of potential, a load impedance having first and second terminals, means for connecting said source of signals between said first electrode and said first terminal of said load impedance, means for connecting both said second electrode and said second terminal of said load impedance to a first potential derived from said source of potential, means for selectively connecting either a second potential derived from said source of potential or a third potential derived from said source of potential to said control electrode, said second potential being of such magnitude and polarity with respect to said first potential that said device blocks the transmission of signals between said source of signals and said load impedance, and said third potential being of such magnitude and polarity with respect to said first potential that said device is enabled to pass signals between said signal source and said load impedance with the instantaneous value of said signals determining which of said first and second junctions functions as an emitter junction and which of said first and second junctions functions as a collector junction.

References Cited in the file of this patent

UNITED STATES PATENTS

| | | |
|---|---|---|
| 2,670,445 | Felker | Feb. 23, 1954 |
| 2,691,073 | Lowman | Oct. 5, 1954 |
| 2,698,416 | Sherr | Dec. 28, 1954 |